(12) United States Patent
Dang (10) Patent No.: US 10,182,050 B2
(45) Date of Patent: *Jan. 15, 2019

(54) DATA PROCESSING BASED ON TWO-DIMENSIONAL CODE

(71) Applicant: Alibaba Group Holding Limited, Grand Cayman (KY)

(72) Inventor: Tao Dang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,633

(22) Filed: Dec. 14, 2017

(65) Prior Publication Data

US 2018/0109518 A1 Apr. 19, 2018

Related U.S. Application Data

(63) Continuation of application No. 15/371,482, filed on Dec. 7, 2016, now Pat. No. 9,887,994, which is a (Continued)

(30) Foreign Application Priority Data

Sep. 2, 2013 (CN) .......................... 2013 1 0392680

(51) Int. Cl.
*H04L 29/00* (2006.01)
*H04L 29/06* (2006.01)
(Continued)

(52) U.S. Cl.
CPC ........ *H04L 63/0853* (2013.01); *G06F 3/0481* (2013.01); *G06F 17/30879* (2013.01);
(Continued)

(58) Field of Classification Search
CPC ............ G06Q 20/3276; G06Q 20/327; G06Q 20/4012; G06Q 20/204; G06Q 20/363
See application file for complete search history.

(56) References Cited

U.S. PATENT DOCUMENTS

2004/0169082 A1 9/2004 Lebaschi et al.
2005/0178846 A1 8/2005 Silverbrook
(Continued)

FOREIGN PATENT DOCUMENTS

| CN | 102915496 A | 2/2013 |
|---|---|---|
| CN | 103218740 A | 7/2013 |
| JP | 2011096217 | 5/2011 |

OTHER PUBLICATIONS

Translation of Chinese Office Action dated Dec. 1, 2016 in corresponding Chinese Application No. 201310392680.1, 11 pages.
(Continued)

*Primary Examiner* — Ghazal B Shehni
(74) *Attorney, Agent, or Firm* — Lee & Hayes, PLLC (57) ABSTRACT

The present disclosure provides example methods and apparatuses of data processing based on a two-dimensional code. The two-dimensional code is generated upon receiving a data processing request from a user of a first communication device. Information relating to the data processing request obtained through scanning the two-dimensional code by a second communication device is received. A user interface for data processing is generated at the second communication device based on the information relating to the data processing request. The present techniques for data processing based on the two-dimensional code use the two-dimensional code to complete logging-in and avoid the tedious logging-in process, thereby conveniently, efficiently, and securely implements data output processing.

20 Claims, 3 Drawing Sheets

Related U.S. Application Data continuation of application No. 14/473,729, filed on Aug. 29, 2014, now Pat. No. 9,547,723.

(51) Int. Cl.

| | |
|---|---|
| *G06F 3/0481* | (2013.01) |
| *G06F 17/30* | (2006.01) |
| *G06Q 20/32* | (2012.01) |
| *G06F 21/35* | (2013.01) |
| *G06K 7/14* | (2006.01) |

(52) U.S. Cl.
CPC .......... *G06F 21/35* (2013.01); *G06K 7/1417* (2013.01); *G06Q 20/327* (2013.01); *G06Q 20/3276* (2013.01)

(56) References Cited

U.S. PATENT DOCUMENTS

| | | |
|---|---|---|
| 2006/0036502 A1 | 2/2006 | Farrell |
| 2006/0163360 A1 | 7/2006 | Steusloff et al. |
| 2006/0293929 A1 | 12/2006 | Wu et al. |
| 2007/0022058 A1 | 1/2007 | Labrou et al. |
| 2008/0301464 A1 | 12/2008 | Parkinson |
| 2010/0219240 A1 | 9/2010 | Yang et al. |
| 2011/0150266 A1 | 6/2011 | Hohndel |
| 2012/0160912 A1 | 6/2012 | Laracey |
| 2012/0215669 A1 | 8/2012 | Lieberman et al. |
| 2012/0267432 A1 | 10/2012 | Kuttuva |
| 2013/0034227 A1 | 2/2013 | Vaughan et al. |
| 2013/0125200 A1 | 5/2013 | Sharma |
| 2013/0219479 A1 | 8/2013 | DeSoto et al. |
| 2013/0256398 A1 | 10/2013 | Godsey |
| 2014/0108810 A1 | 4/2014 | Chenna |
| 2015/0067781 A1 | 3/2015 | Dang |
| 2017/0085560 A1 | 3/2017 | Dang |

OTHER PUBLICATIONS

Office action for U.S. Appl. No. 15/371,482, dated Jan. 11, 2017, Dang, "Data Processing Based on Two-Dimensional Code", 10 pages.

Office action for U.S. Appl. No. 14/473,729, dated Dec. 16, 2015, Dang, "Data Processing Based on Two-Dimensional Code", 8 pages.

Office action for U.S. Appl. No. 14/473,729, dated May 10, 2016, Dang, "Data Processing Based on Two-Dimensional Code", 10 pages.

Office action for U.S. Appl. No. 15/371,482, dated Jun. 28, 2017, Dang, "Data Processing Based on Two-Dimensional Code", 6 pages.

PCT Search Report and Written Opinion dated Nov. 11, 2014 for PCT Application No. PCT/US14/53559, 9 Pages.

The European Office Action dated Apr. 19, 2018 for European Patent Application No. 14776927.7, a counterpart foreign application of U.S. Pat. No. 9,547,723, 5 pages.

Machine translated the Chinese Office Action for Chinese Patent Application No. 201310392680.1, dated Jul. 24, 2017, a counterpart foreign application of U.S. Appl. No. 14/473,729, 11 pages.

Translated Japanese Office Action dated Aug. 7, 2018, for Japanese Application No. 2016-537918, a counterpart foreign application of U.S. Pat. No. 9,547,723, 12 pages.

DATA PROCESSING BASED ON TWO-DIMENSIONAL CODE

CROSS REFERENCE TO RELATED PATENT APPLICATIONS

This application is a continuation of U.S. patent Ser. No. 15/371,482 filed on 7 Dec. 2016, which is a continuation of U.S. patent Ser. No. 14/473,729 filed on 29 Aug. 2014, which claims foreign priority to Chinese Patent Application No. 201310392680.1 filed on 2 Sep. 2013, entitled "Method and Apparatus of Data Processing Based on Two-Dimensional Code," which are hereby incorporated by reference in their entirety.

TECHNICAL FIELD

The present disclosure is related to the Internet field, and more particularly, to a method and apparatus of data processing based on a two-dimensional code.

BACKGROUND

A communication network can provide various data transmission services, such as data transfer and data exchange, to users. Sometimes, however, during data processing, a user needs to log in prior to conducting an output processing through the communication network. Sometimes, a log-in history is not recorded due to a security concern. Each time before the user conducts data processing, the user needs to input an account name, an account password, a verification code, and even a special password for data processing. Due to the use of the special password for data processing, the log-in often fails as the user habitually uses the account password as the special password for data processing. In addition, after the log-in is successful, a security product may need to be verified. Thus, it is almost impossible for a digital certificate user to successfully conduct data processing under an environment without the certificate.

By using the above methods, it is a difficult and tedious procedure to input log-in information when the user needs to conduct data processing, which has a high error rate and is easily interfered with by the security product.

Thus, there is a need for a technique or method in this field wherein the user may conveniently, efficiently, and securely implement the required data processing without experiencing the tedious log-in process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present techniques improve diversity of results in the direction technology.

The present disclosure provides a technical solution to solve problems associated with the conventional techniques. The present disclosure provides an example method of data processing based on a two-dimensional code.

The two-dimensional code is generated upon receiving a data processing request from a user of a first communication device. Information relating to the data processing request, which is obtained through scanning the two-dimensional code by a second communication device, is received. A user interface for data processing is generated at the second communication device based on the information relating to the data processing request.

The present disclosure also provides an example apparatus of data processing based on a two-dimensional code. The apparatus may include a two-dimensional code generating module, a receiving module, and a user interface generating module. The two-dimensional code generating module generates a two-dimensional code upon receiving a data processing request from a user of a first communication device. The receiving module receives information relating to the data processing request, which is obtained through scanning the two-dimensional code by a second communication device. The user interface generating module generates a user interface for data processing at the second communication device based on the information relating to the data processing request.

The present techniques for data processing based on a two-dimensional code use the two-dimensional code to complete logging in and avoid the tedious log-in process, thereby conveniently, efficiently, and securely implements data output processing.

BRIEF DESCRIPTION OF THE DRAWINGS

The FIGs in the present disclosure are briefly described below to better illustrate the present techniques and are part of the present disclosure. The example embodiments and their explanations are used to illustrate the present disclosure and should not be used to impose improper restriction to the present disclosure.

DETAILED DESCRIPTION

The following description describes the present disclosure with reference to the accompanied FIGs to clearly illustrate the purpose, technical solutions, and advantages of the present disclosure. The described example embodiments are just a portion of embodiments instead of all embodiments of the present disclosure. Based on the example embodiments of the present disclosure, one of ordinary skill in the art may obtain other embodiments without using creative efforts, which are also under protection scope of the present disclosure.

For purpose of brevity, the following description may omit certain unnecessary technical characteristics that are well-know to one of ordinary skill in the art.

The present disclosure provides a method of data processing based on a two-dimensional code. A bar code technology is developed when the computer technology is applied to the real world. The bar technology is an automatic identification technology that is widely used in the fields of business, logistics, book management, storage, industrial process control, transportation, etc. The bar technology has many advantages, which include high input speed, high accuracy, low cost, high reliability, and still occupies an important position in the current automatic identification technology.

A one-dimensional bar code, although it increases a data collection and processing speed, can only identify a product instead of describing the product due to a limit of its information volume. Thus, the one-dimensional code relies heavily on a computer network and database. Where there is no database or it is inconvenient to connect to the network, the one-dimensional code has few uses. Thus, a two-dimensional bar code with high information volume was proposed.

The two-dimensional code was initially invented in Japan. It uses certain specific geometric figures and distributes black and white figures on a two-dimensional surface according to certain rules to record data information. The two-dimensional code uses a concept of bit streams with "0" and "1" that constitute an inherent computer logic basis and uses certain geometric figures that correspond to a binary system to represent character value information. Through an image inputting device or an optoelectronic scanning device, the two-dimensional bar code may be automatically identified to implement automatic information processing. The two-dimensional bar code has certain common attributes of the bar code technology. For example, each code has its unique character set. Each character occupies a certain width and has certain verifying functions. In addition, the two-dimensional bar code has certain characteristics such as automatically identifying information at different lines and processing a rotation change of the figures.

As the two-dimensional bar code can represent information both horizontally and vertically at the same time, it represents a lot of information in a quite small area. Common types of the two-dimensional bar code include a stacked two-dimensional bar code and a matrix two-dimensional code. In the present disclosure, the two-dimensional bar code is briefly referred to as two-dimensional code.

Figure 1:
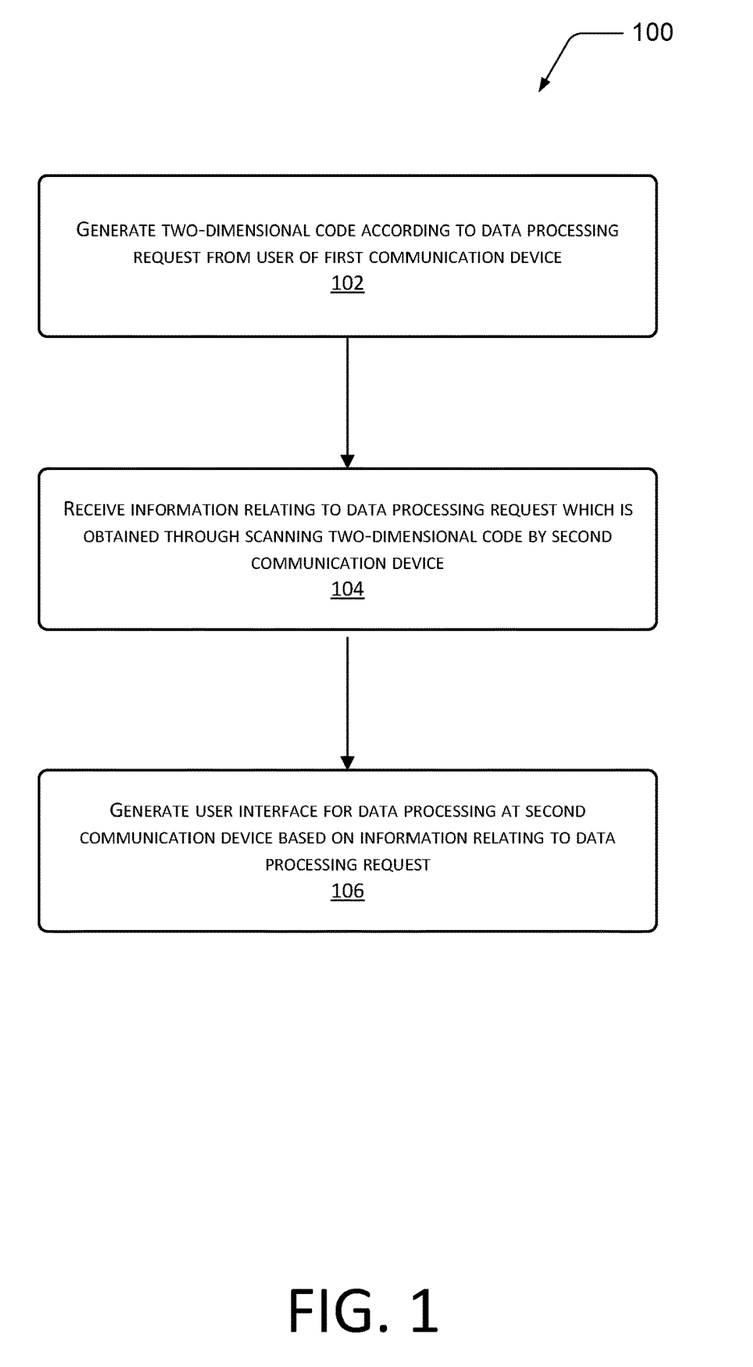
FIG. 1 is a flowchart illustrating an example method of data processing based on a two-dimensional code in accordance with an example embodiment of the present disclosure.

FIG. 1 is a flowchart illustrating an example method 100 of data processing based on a two-dimensional code in accordance with an example embodiment of the present disclosure.

At 102, the two-dimensional code is generated according to a data processing request from a user of a first communication device.

When a user initiates the data processing request through the first communication device, a client terminal of data processing may generate the two-dimensional code according to a type of the data processing request and other parameters included in the data processing request.

For example, when the user purchases a product from a shopping website, the user submits an order through a personal computer (PC), chooses a payment method of the order, and initiates the data processing request for payment. When the data processing request for payment is received, the client terminal of data processing may generate the two-dimensional code according to information of the data processing request for payment. The information of the data processing request for payment may include data including an order number, a product name, a total amount of the order, information of a payment receiving party, a transaction type (such as a guaranteed transaction, an instant payment transaction, etc). In addition, the information of the data processing request for payment may also include a payment type, an agreed overdue time, etc. The two-dimensional code generated according to the information of the data processing request for payment may include one or more data included in the information of the data processing request for payment.

At 104, information relating to the data processing request, which is obtained through scanning the two-dimensional code by a second communication device, is received from the second communication device.

According to an example embodiment of the present disclosure, the second communication device scans the two-dimensional code. A server of data processing receives the information relating to the data processing request which is obtained by scanning the two-dimensional code.

At 106, a user interface for data processing is generated at the second communication device based on the information relating to the data processing request.

According to an example embodiment of the present disclosure, the server of data processing generates the user interface for data processing based on the information obtained by the second communication device that scans the two-dimensional code.

For example, the server of data processing generates a user interface for payment based on the received order information. Such user interface is used to finally complete processing payment data. In other words, the user interface is used to inform the user of the information relating to the data processing of the payment and receive a payment confirmation from the user. If the user confirms the payment, the data processing of the payment completes. The user refers to a user who has payment authorization and is willing to confirm the payment. The user may be the user at 102 that initiates the data processing request or another user. The confirmation of payment by the user may be a confirmation by a password, a confirmation by a digital certificate, or any other confirmation method that is recognized by the client terminal of data processing for the payment.

The first communication device, for example, may be any communication device that is capable of connecting with the server of data processing through a network, such as a desktop personal computer (PC), a laptop, a tablet, a cell phone, etc. The second communication device, for example, may be any communication device that is capable of connecting with the server of data processing through the network and scanning the two-dimensional code, such as a desktop PC, a laptop, a tablet, a cell phone, etc., which has capability of scanning the two-dimensional code.

Figure 2:
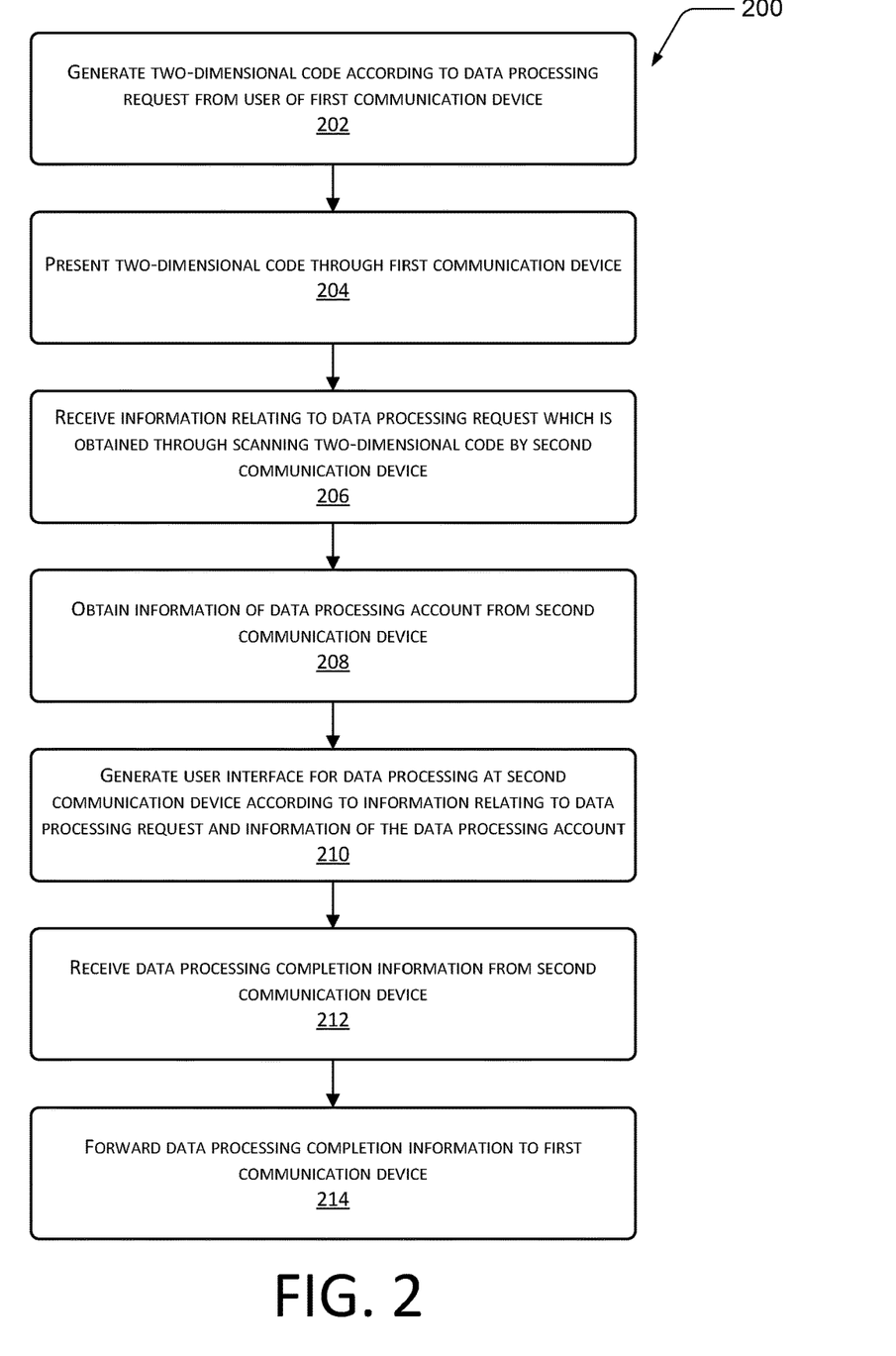
FIG. 2 is a flowchart illustrating another example method of data processing based on the two-dimensional code in more details in accordance with another more detailed example embodiment of the present disclosure.

FIG. 2 is a flowchart illustrating another example method 200 of data processing based on a two-dimensional code in accordance with another more detailed example embodiment of the present disclosure.

At 202, the two-dimensional code is generated according to a data processing request from a user of a first communication device.

When a user initiates the data processing request through the first communication device, a client terminal of data processing may generate the two-dimensional code according to a type of the data processing request and other parameters included in the data processing request. For example, the generated two-dimensional code may further include a uniform resource locator (URL) of a log-in address of a data processing account. The URL may include the type and other parameters of the data processing request.

For example, when the user purchases a product from a shopping web site, the user submits an order through a PC, chooses a payment method of the order, and initiates the data processing request for payment. When the data processing request for payment is received, the client terminal of data processing may generate the two-dimensional code according to information of the data processing request for payment. The information of the data processing request for payment may include data including an order number, a product name, a total amount of the order, information of a payment receiving party, a transaction type (such as a guaranteed transaction, an instant payment transaction, etc.). In addition, the information of the data processing request for payment may also include a payment type, an agreed overdue time, etc. The two-dimensional code generated according to the information of the data processing request for payment may include one or more data included in the information of the data processing request for payment.

At 204, the two-dimensional code is presented through the first communication device. According to an example embodiment of the present disclosure, the two-dimensional code may be presented through a display of the first communication device.

For example, the two-dimensional code including the information of the data processing request for payment may be presented at an interface through a display of a PC.

At 206, the information relating to the data processing request, which is obtained through scanning the two-dimensional code by a second communication device, is received from the second communication device.

According to an example embodiment of the present disclosure, the second communication device scans the two-dimensional code and sends the information obtained through scanning to the server of data processing for payment. The server of data processing for payment then receives the information of the data processing request for payment.

For example, a cell phone is used to scan the two-dimensional code that is generated for the information relating to the data processing request for payment and send the information obtained through scanning to the server of data processing for payment. The server of data processing receives the information relating to the data processing for payment.

At 208, information of a data processing account is obtained from a second communication device.

When the second communication device scans the two-dimensional code, the second communication device may be required to submit information of a valid data processing account to the server of data processing. According to an example embodiment of the present disclosure, when client software that is compatible with the server of data processing is installed at the second communication device, the server of data processing may obtain information of the data processing account that is already logged in through the client software. If information of the data processing account that is already logged in is not detected, the user may be prompted to log in by using the log-in functionality of the data processing account provided by the client. Thus, the information of the data processing account is obtained.

According to another example embodiment of the present disclosure, when the client software is not installed at the second communication device, a general purpose bar scanning machine at the second communication device may be used to scan the two-dimensional code to obtain the URL of the log-in address of the data processing account. A web browser installed at the second communication device is then used to open the URL to display a log-in interface of the data processing account. When the user successfully completes the log-in operation of the data processing account, the serve of data processing obtains the information of the data processing account.

For example, when a client that processes payment data is installed at a cell phone, as the client provides log-in function to the data processing account for payment, the client of processing payment data obtains the information of the data processing account for payment through the client when the user successfully logs in. If it is detected that the user has not logged in, the user may be prompted to log in by using the log-in function of the data processing account provided by the client of processing payment data. When the client software is not installed at the second communication device, a general purpose bar scanning machine at the second communication device may be used to scan the two-dimensional code to obtain the URL of the log-in address of the data processing account for payment. A web browser installed at the second communication device is then used open the URL to display a log-in interface of the data processing account for payment. When the user successfully completes the log-in operation of the data processing account for payment at a page corresponding to the URL, the server of data processing for payment obtains the information of the data processing account for payment.

At 210, a user interface for data processing is generated at the second communication device according to the information relating to the data processing request and the information of the data processing account.

According to an example embodiment of the present disclosure, the user interface for data processing is generated based on the received information relating to the data processing request, which is obtained through scanning the two-dimensional code, and the information of the data processing account, and presented at the second communication device.

For example, the user interface for data processing may be generated based on the received information relating to the data processing request for payment (such as an order number, a product name, an order amount, information of receiving party, etc.), which is obtained through scanning the two-dimensional code, and the information of the data processing account obtained from operations at 208.

According to an example embodiment of the present disclosure, when the client software that is compatible with the server of payment data processing is installed at the second communication device, the client software may be used to scan the two-dimensional code. The server of payment data processing sends the received information relating to the data processing request for payment (such as the order number, the product name, the order amount, the information of receiving party, etc.), which is obtained through scanning the two-dimensional code, and the information of the data processing account obtained from operations at 208 to the client software. The client software generates the user interface for payment based on such information.

According to another example embodiment of the present disclosure, when the client software that is compatible with the server of payment data processing is not installed at the second communication device, a general purpose bar scanning machine at the second communication device may be used to scan the two-dimensional code. The server of payment data processing generates a URL based on the received information relating to the data processing request for payment (such as the order number, the product name, the order amount, the information of receiving party, etc.), which is obtained through scanning the two-dimensional code, and the information of the data processing account obtained from operations at 208 to the client software. The server of payment data processing sends the URL to the second communication device. The second communication device uses its installed web browser to open the received URL to present the user interface for payment at the second communication device.

The user interface for payment may include information such as the information of the receiving party, the product name, the order amount, etc.

The above user interface may be used to finally complete processing the payment data. In other words, the user interface may be used to inform the user of the information relating to processing the payment data and receive the payment confirmation from the user. If the user confirms the payment, the processing of the payment data is completed this time. The user may refer to the user who has payment authorization and is willing to confirm the payment at 208.

The user may be the user at 102 that initiates the data processing request or another user. The confirmation of payment by the user may be a confirmation by a password, a confirmation by a digital certificate, or any other confirmation method that is recognized by the client terminal of data processing for the payment.

The first communication device, for example, may be any communication device that is capable of connecting with the server of data processing through a network, such as a desktop personal computer (PC), a laptop, a tablet, a cell phone, etc. The second communication device, for example, may be any communication device that is capable of connecting with the server of data processing through the network and scanning the two-dimensional code, such as a desktop PC, a laptop, a tablet, a cell phone, etc., which has the capability of scanning the two-dimensional code.

At 212, data processing completion information is received from the second communication device.

According to an example embodiment of the present disclosure, when the information relating to completing data processing is input into the above user interface for data processing and such information is sent to the server of data processing, the server of data processing receives the information relating to completing data processing from the second communication device.

For example, when the user who has the payment authorization of the data processing account inputs information that approves the payment at the user interface for payment (such as static or dynamic password) and submits such information to the server of processing payment data, the server of processing payment data completes the payment. The data processing is completed. When the user who has the payment authorization of the data processing account inputs information that rejects the payment at the user interface for payment and submits such information to the server of processing payment data, the server of processing payment data rejects the payment. The data processing is also completed. When the methods of the present disclosure are applied to processing the payment data, the tedious operations that log into the client of processing payment data at the first communication device are prevented. In addition, when the cell phone is used to complete small amount payment data processing, due to the high security of the cell phone, an efficient process that waives the password may be used, thereby enabling a simple and efficient payment data processing when ensuring security.

At 214, the data processing completion information is forwarded to the first communication device.

According to an example embodiment of the present disclosure, after receiving the data processing completion information from the second communication device, the server of data processing forwards the data processing completion information to the first communication device. After receiving such information, the first communication device, according to contents included in the information, displays a result of payment data processing of this transaction to the user.

Figure 3:
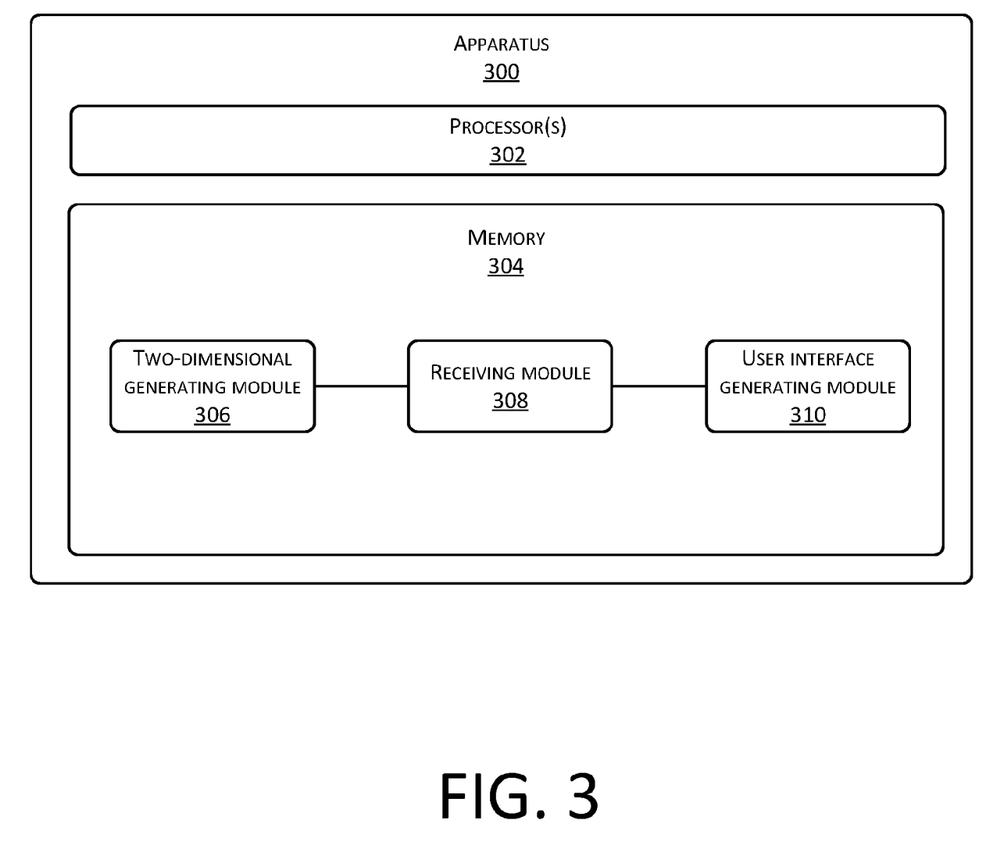
FIG. 3 is a diagram illustrating an example apparatus of data processing based on the two-dimensional code in accordance with another example embodiment of the present disclosure.

The present disclosure also provides an example apparatus of data processing based on a two-dimensional code. FIG. 3 is a diagram illustrating an example apparatus 300 of data processing based on the two-dimensional code in accordance with another example embodiment of the present disclosure. The apparatus 300 may include one or more processor(s) 302 or data processing unit(s) and memory 304. The memory 304 is an example of computer-readable media. The memory 304 may store therein a plurality of modules including a two-dimensional code generating module 306, a receiving module 308, and a user interface generating module 310. The two-dimensional code generating module 306 generates a two-dimensional code according to a data processing request received from a user of a first communication device. The receiving module 308 receives information relating to the data processing request, which is obtained through scanning the two-dimensional code by a second communication device. The user interface generating module 310 generates a user interface for data processing at the second communication device based on the information relating to the data processing request.

According to an example embodiment of the present disclosure, the apparatus may also include a two-dimensional code present module that presents the two-dimensional code through the first communication device.

According to an example embodiment of the present disclosure, the user interface generation module 310 may include a module that obtains information of a data processing account from the second communication device and another module that generates the user interface for data processing according to the information relating to the data processing request and the information of the data processing account.

According to an example embodiment of the present disclosure, the apparatus 300 may also include a module that receives the data processing completion information from the second communication device.

According to another example embodiment of the present disclosure, the apparatus 300 may further include a module that forwards the data processing completion information to the first communication device.

In a standard configuration, a computing device, such as the server or the communication device, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the element.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method comprising:
    generating a two-dimensional code according to a data processing request from a user of a first communication device;
    receiving information relating to the data processing request from a second communication device that scans the two-dimensional code; and
    generating a user interface for data processing at the second communication device based on the information relating to the data processing request.

2. The method of claim 1, wherein the information relating to the data processing request is obtained through scanning the two-dimensional code by the second communication device.

3. The method of claim 1, wherein the generating the two-dimensional code according to the data processing request from the user of the first communication device comprises presenting the two-dimensional code at the first communication device.

4. The method of claim 1, wherein the generating the user interface for data processing at the second communication device based on the information relating to the data processing request comprises:
    obtaining information of a data processing account from the second communication device; and
    generating the user interface for data processing at the second communication device according to the information relating to the data processing request and the information of the data processing account.

5. The method of claim 4, wherein the obtaining the information of the data processing account from the second communication device comprises using a client at the second communication device that is compatible with a server of data processing to obtain the information of the data processing account.

6. The method of claim 4, wherein the obtaining the information of the data processing account from the second communication device comprises:
    using a scanner at the second communication device to scan the two-dimensional communication code to obtain a uniform resource locator (URL) of a log-in address of the data processing account;
    using a web browser at the second communication device to open the URL to present a log-in interface of the data processing account; and
    obtaining the information of the data processing account when the user completes a log-in operation.

7. The method of claim 1, further comprising receiving data processing completion information from the second communication device.

8. The method of claim 7, further comprising forwarding the data processing completion information to the first communication device.

9. An apparatus comprising:
    one or more processors; and
    one or more computer-readable media stored thereon computer-executable instructions executable by the one or more processors to perform operations comprising:
        generating a two-dimensional code according to a data processing request from a user of a first communication device;
        receiving information relating to the data processing request from a second communication device that scans the two-dimensional code; and
        generating a user interface for data processing at the second communication device based on the information relating to the data processing request.

10. The apparatus of claim 9, wherein the information relating to the data processing request is obtained through scanning the two-dimensional code by the second communication device.

11. The apparatus of claim 9, wherein the operations further comprise presenting the two-dimensional code at the first communication device.

12. The apparatus of claim 9, wherein the generating the user interface for data processing at the second communication device based on the information relating to the data processing request comprises:
    obtaining information of a data processing account from the second communication device; and
    generating the user interface for data processing at the second communication device according to the information relating to the data processing request and the information of the data processing account.

13. The apparatus of claim 9, wherein the operations further comprise receiving data processing completion information from the second communication device.

14. The apparatus of claim 13, wherein the operations further comprise forwarding the data processing completion information to the first communication device.

15. One or more computer-readable media stored thereon computer-executable instructions executable by one or more processors to perform operations comprising:
- generating a two-dimensional code according to a data processing request from a user of a first communication device;
- presenting the two-dimensional code at the first communication device;
- receiving information relating to the data processing request from a second communication device that scans the two-dimensional code;
- obtaining information of a data processing account from the second communication device; and
- generating a user interface for data processing at the second communication device according to the information relating to the data processing request and the information of the data processing account.

16. The one or more computer-readable media of claim 15, wherein the operations further comprise receiving data processing completion information form the second communication device.

17. The one or more computer-readable media of claim 15, wherein the operations further comprise forwarding the data processing completion information to the first communication device.

18. The one or more computer-readable media of claim 15, wherein the information relating to the data processing request is obtained through scanning the two-dimensional code by the second communication device.

19. The one or more computer-readable media of claim 15, wherein the obtaining the information of the data processing account from the second communication device comprises using a client at the second communication device that is compatible with a server of data processing to obtain the information of the data processing account.

20. The one or more computer-readable media of claim 15, wherein the obtaining the information of the data processing account from the second communication device comprises:
- using a scanner at the second communication device to scan the two-dimensional communication code to obtain a uniform resource locator (URL) of a log-in address of the data processing account;
- using a web browser at the second communication device to open the URL to present a log-in interface of the data processing account; and
- obtaining the information of the data processing account when the user completes a log-in operation.

\* \* \* \* \*